United States Patent
Lamp et al.

(10) Patent No.: US 9,764,701 B2
(45) Date of Patent: Sep. 19, 2017

(54) ENERGY STORAGE DEVICE FOR A MOTOR VEHICLE

(71) Applicant: Bayerische Motoren Werke Aktiengesellschaft, Munich (DE)

(72) Inventors: Peter Lamp, Unterfoehring (DE); Andreas Stoermer, Unterschleissheim (DE); Marcus Hafkemeyer, Jersey City, NJ (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 350 days.

(21) Appl. No.: 13/903,403

(22) Filed: May 28, 2013

(65) Prior Publication Data

US 2013/0252035 A1   Sep. 26, 2013

Related U.S. Application Data

(63) Continuation of application No. PCT/EP2011/071165, filed on Nov. 28, 2011.

(30) Foreign Application Priority Data

Nov. 29, 2010  (DE) .................. 10 2010 062 116

(51) Int. Cl.
*H02J 7/00*     (2006.01)
*H02J 7/14*     (2006.01)
(Continued)

(52) U.S. Cl.
CPC ........ *B60R 16/033* (2013.01); *B60L 11/1853* (2013.01); *B60L 11/1868* (2013.01);
(Continued)

(58) Field of Classification Search
CPC ............................. B60R 16/033; H01M 16/00
(Continued)

(56) References Cited

U.S. PATENT DOCUMENTS 6,844,634 B2 * 1/2005 Kobayashi et al. ........ 290/40 C
9,425,492 B2 * 8/2016 Mao .................... H01M 2/1072
(Continued)

FOREIGN PATENT DOCUMENTS

DE    10 2010 000 656 A1   9/2010
WO    WO 03/088375 A2     10/2003
(Continued)

OTHER PUBLICATIONS

International Preliminary Report on Patentability (PCT/IB/373), including Written Opinion (PCT/ISA/237) dated Jun. 4, 2013 (seven (7) pages).

(Continued)

*Primary Examiner* — Samuel Berhanu
*Assistant Examiner* — Tarikh Rankine
(74) *Attorney, Agent, or Firm* — Crowell & Moring LLP

(57) ABSTRACT

A motor vehicle energy storage device includes a first electrical energy store characterized by a first characteristic voltage curve defining the open-circuit voltage of the first energy store depending on the relative charge state and by a first characteristic resistance curve defining the internal resistance of the first energy store relevant for a charge process of the energy store, and a second electrical energy store connected in parallel and characterized by a second characteristic voltage curve defining the open-circuit voltage of the second energy store depending on the relative charge state and by a second characteristic resistance curve defining the internal resistance relevant for a charge process of the second energy store. The voltage value ranges covered by the first characteristic voltage curve and the second characteristic voltage curve partially overlap, and the first and second characteristic resistance curves and the second characteristic resistance curve have exactly one intersecting point.

6 Claims, 2 Drawing Sheets

(51) Int. Cl.
*B60L 11/18* (2006.01)
*B60L 11/00* (2006.01)
*G01R 31/36* (2006.01)
*B60R 16/033* (2006.01)
*H01M 16/00* (2006.01)
*H02J 7/34* (2006.01)

(52) U.S. Cl.
CPC ........... *H01M 16/00* (2013.01); *H02J 7/1423* (2013.01); *H02J 7/345* (2013.01); *Y02T 10/7005* (2013.01); *Y02T 10/7066* (2013.01)

(58) Field of Classification Search
USPC ............................................................ 429/9
See application file for complete search history.

(56) References Cited

U.S. PATENT DOCUMENTS

| | | | |
|---|---|---|---|
| 2002/0102447 A1 | 8/2002 | Kato | |
| 2002/0109506 A1* | 8/2002 | Kawakami et al. | 324/522 |
| 2004/0095098 A1 | 5/2004 | Turner et al. | |
| 2004/0138785 A1* | 7/2004 | Emori et al. | 700/286 |
| 2004/0201365 A1* | 10/2004 | Dasgupta et al. | 320/116 |
| 2006/0250113 A1 | 11/2006 | Tsai et al. | |
| 2008/0007201 A1 | 1/2008 | Riegel et al. | |
| 2008/0290842 A1 | 11/2008 | Davis et al. | |
| 2011/0001352 A1* | 1/2011 | Tamura | B60R 16/033 307/9.1 |

FOREIGN PATENT DOCUMENTS

| | | | | |
|---|---|---|---|---|
| WO | WO 2005/027345 A1 | 3/2005 | | |
| WO | WO 2005027345 A1 * | 3/2005 | | 320/116 |

OTHER PUBLICATIONS

International Search Report dated Mar. 5, 2012 with English translation (four (4) pages).
German Search Report dated Jul. 25, 2012 with partial English translation (ten (10) pages).

* cited by examiner

ENERGY STORAGE DEVICE FOR A MOTOR VEHICLE

CROSS REFERENCE TO RELATED APPLICATIONS

This application is a continuation of PCT International Application No. PCT/EP2011/071165, filed Nov. 28, 2011, which claims priority under 35 U.S.C. §119 from German Patent Application No. 10 2010 062 116.1, filed Nov. 29, 2010, the entire disclosures of which are herein expressly incorporated by reference.

BACKGROUND AND SUMMARY OF THE INVENTION

The present invention relates to an energy storage device for a motor vehicle, including a first electrical energy store, which is characterized by a first characteristic voltage curve defining the open-circuit voltage of the first electrical energy store depending on the relative charge state of the energy store, and by a first characteristic resistance curve defining the internal resistance of the first electrical energy store of relevance for a charging process of the first electrical energy store depending on the relative charge state of the energy store, and further including a second electrical energy store which is connected in parallel to the first electrical energy store, which is characterized by a second characteristic voltage curve defining the open-circuit voltage of the second electrical energy store depending on the relative charge state of the energy store, and by a second characteristic resistance curve defining the internal resistance of the second electrical energy store of relevance for a charging process of the second electrical energy store depending on the relative charge state of the energy store.

Due to the increasing number of electrical consumer units that are provided for comfort and safety functions, and as a result of the active involvement of the conventional lead-acid battery as an electrical energy store in hybrid vehicle functions, the design of a conventional 14 V vehicle electrical system in modern motor vehicles, and particularly in passenger cars, will in the future undergo great changes. For example, functions such as automatic switching off and restarting of the engine during operation of the vehicle and efficient braking energy recovery during overrun conditions of the vehicle will increasingly be implemented. The resulting demands placed on the energy store will be further increased by more frequent discharge phases in the high current region which result, in modern vehicles, from additional electrical assemblies. Examples are electrical or electromechanical consumer units such as electric motors for assisted steering and cooling circuit pumps. In order to increase the availability of consumer functions and to extend the service life of the energy store, the lead-acid battery can be replaced, for example, with a suitable energy store or the vehicle electrical system can be enhanced with a further energy store and extended into a two energy-store vehicle electrical system.

Energy storage devices of this type in a vehicle electrical system are disclosed in the prior art as two energy-store vehicle electrical systems. For example, U.S. Pat. No. 6,844,634 B2 discloses the parallel connection of a lead-acid battery with a lithium ion battery as the basis for a control system for providing electrical power in the vehicle. The interaction of two sensors for the batteries with a control device is central to achieving this.

It is an object of the present invention to provide an improved energy storage device for a motor vehicle having two electrical energy stores.

This and other objects are achieved with an energy storage device for a motor vehicle, including a first electrical energy store, which is characterized by a first characteristic voltage curve defining the open-circuit voltage of the first electrical energy store depending on the relative charge state of the energy store, and by a first characteristic resistance curve defining the internal resistance of the first electrical energy store of relevance for a charging process of the first electrical energy store depending on the relative charge state of the energy store, and further including a second electrical energy store which is connected in parallel to the first electrical energy store, and which is characterized by a second characteristic voltage curve defining the open-circuit voltage of the second electrical energy store depending on the relative charge state of the energy store, and by a second characteristic resistance curve defining the internal resistance of the second electrical energy store of relevance for a charging process of the second electrical energy store depending on the relative charge state of the energy store. The voltage value range which is covered by the first characteristic voltage curve and the voltage value range covered by the second characteristic voltage curve partially overlap. The first characteristic resistance curve and the second characteristic resistance curve have precisely one intersection point.

According to the invention, the energy storage device is characterized by a partial overlap of the voltage value range which is covered by the characteristic voltage curve of the first electrical energy store, identified herein as the first characteristic voltage curve, with the voltage value range covered by the characteristic voltage curve of the second electrical energy store, identified herein as the second characteristic voltage curve. A partial overlap of the two voltage value ranges is understood, herein, to mean that apart from an intersection quantity of the two voltage value ranges not equal to zero, a partial quantity of the voltage value range not equal to zero exists which is not a partial quantity of the other voltage value range. In addition, the characteristic internal resistance curve of the first electrical energy store during charging, designated the first characteristic resistance curve, and the characteristic internal resistance curve of the second electrical energy store during charging, designated the second characteristic resistance curve, have precisely one intersection point.

An advantage of the invention lies therein that an interaction takes place between the two electrical energy stores with regard to the voltage levels and relative charge states thereof. According to Kirchhoff's laws, at every point-in-time, a charging current or a discharging current of the energy storage device is defined by adding together the individual charging or discharging currents of the two electrical energy stores. In the context of the applicability of Kirchhoff's laws, the parallel connection of the two electrical energy stores represents a node. This presupposes the observance of a sign convention for the two directions of current flow, i.e. for the charging current as the first flow direction (one sign) and the discharging current as the other flow direction (the other sign). By means of this interaction, the technical effort required for operating the energy storage device in the motor vehicle can be minimized. In the context of the present document, the technical effort required for operating the energy storage device in the motor vehicle covers, for example, battery sensors for monitoring voltages and currents of the two electrical energy stores or for regulating the charging and discharging currents of the two electrical energy stores. In automotive engineering, regulation of this type is often designated an operating strategy for electrical energy stores and is implemented in the form of a software module in a control unit.

The special interaction of the two electrical energy stores enables the implementation of a simple operating strategy with a high degree of functionality, as described in the exemplary embodiment of this document.

It is also particularly advantageous that, due to the interaction of the two electrical energy stores, the service life of the energy storage devices can be optimized.

According to a preferred embodiment of the invention, the first characteristic resistance curve for relative charge states which lie above the value of the relative charge state at the intersection point lies above the second characteristic resistance curve. The value of the relative charge state at the intersection point of the two characteristic resistance curves is designated the "critical charge state" in the remainder of this document. In other words, the resistance values of the first characteristic resistance curve for high charge state values (greater than the critical charge state at the intersection of the two characteristic resistance curves) is greater than the resistance values of the second characteristic resistance curve.

A particular advantage of this embodiment is that, in the event that an external charging voltage, which can be generated, for example, by a vehicle electrical system generator, is applied to the energy storage device, the second electrical energy store has a lower charging resistance than the first electrical energy store. This applies at least when the relative charge state of the first electrical energy store is above the critical charge state and the relative charge state of the second electrical energy store lies below the critical charge state. A short charging pulse, such as frequently occurs in modern functions for braking energy recovery, therefore leads to a preferred charge of the second electrical energy store.

According to a further variant of the present invention, the energy storage device (or the energy stores contained therein) is/are configured such that the voltage value range covered by the second characteristic voltage curve contains higher voltage values than the voltage value range covered by the first characteristic voltage curve.

According to the equation of Nernst, which is known to persons skilled in the art, a constant monotonically rising shape of the two characteristic voltage curves in the direction of higher voltage values and in the direction of greater relative charge state values is a precondition. Any deviations caused by overvoltage potentials does not have a limiting effect in the context of the present document. The two characteristic voltage curves do not intersect one another.

The features of the two characteristic voltage curves have the effect that given the same voltage level brought about by the parallel connection of the two electrical energy stores, the relative charge state of the first electrical energy store is greater than the relative charge state of the second electrical energy store.

The features of the two characteristic voltage curves have the advantage that preferably the first electrical energy store is charged from the second electrical energy store if no external charging voltage is applied to the energy storage device. This effect is designated "internal charge transfer" throughout the remainder of the present document. Furthermore, a charging current can only flow from the second electrical energy store to the first electrical energy store (that is, an internal charge transfer) if the first electrical energy store is not completely charged, nor is the second electrical energy store completely discharged. In other words, this means that the equal voltage level caused by the parallel connection of the two electrical energy stores lies in the region of the partial overlap of the two characteristic voltage curves.

According to a further development of the present invention, the energy storage device can be configured such that the first electrical energy store is designed as a lead-acid battery and the second electrical energy store is designed as a lithium ion battery or as a super capacitor.

Particularly advantageously, the lead-acid battery is preferably operated at higher relative charge states than the lithium ion battery or the super capacitor. The service life of a lead-acid battery increases, as a first approximation, with the mean relative charge state, averaged over a long service period. Provided an operating strategy of this type is selected for the energy storage device, that the lead-acid battery is operated at relative charge states close to the complete charge, optimum availability of the energy storage device is ensured. Warranty costs to the motor vehicle manufacturer and maintenance costs for the vehicle keeper are thus reduced.

According to a preferred embodiment of the present invention, the parallel connection of the two electrical energy stores is carried out at neutral potential.

Implementation of the parallel connection of the two electrical energy stores at neutral potential is described in the present document in the form of an embodiment in which at no operating point-in-time does an, or any appreciable, electrical voltage drop exist at the connecting or coupling elements. Thus, in particular, hard wiring, a simple switch and/or a relay, for example, can be considered to be connections at neutral potential. In the context of this voltage neutrality, voltage converting components such as a DC chopper or control circuits, in particular, which partially decouple the two electrical energy stores and which result in diverging voltage levels of the two electrical energy stores during operation, are excluded.

With a parallel connection of this type, therefore, an immense cost advantage can be achieved and a simple operational strategy can be applied. The simplicity of the operational strategy also finds expression in a further cost advantage wherein, during operation of the energy storage device, the detection of the energy store voltage is sufficient for determining the relative charge state for one of the two electrical energy stores. If, for example, the open-circuit voltage is detected between the poles of the lead-acid battery, as a consequence of the known level of the two characteristic voltage curves of the two electrical energy stores relative to one another, the relative charge state of the lithium ion battery can also be determined with sufficient accuracy.

The invention is based on the following considerations. Two electrochemical energy stores can be directly coupled without any voltage-converting element. The two energy stores each have a behavior of the characteristic voltage curves thereof which is different but matched to one another, depending on the relative charge state of each energy store. This characteristic of the two energy stores has the consequence that a complex connection with a DC-DC converter or switching circuits is not needed. This results in ideal technically simple energy storage extensions for increasing the short-cycle capability, along with increased comfort consumer unit availability when static, an efficient short-cycle charge uptake capability and high charging efficiency for storing energy from a braking energy recovery function in conjunction with a stabilizing effect for the vehicle electrical system without costly electronics systems. For example, the coupling can be implemented with an ohmic cable-bound connection of a lead-acid battery with a nominal voltage of 12 V and a lithium ion battery with a nominal voltage of 14 V. In this way, the characteristic advantages of, for example, a lead-acid battery, such as a good cold start capability, and a favorable cost-benefit ratio are ideally extended.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
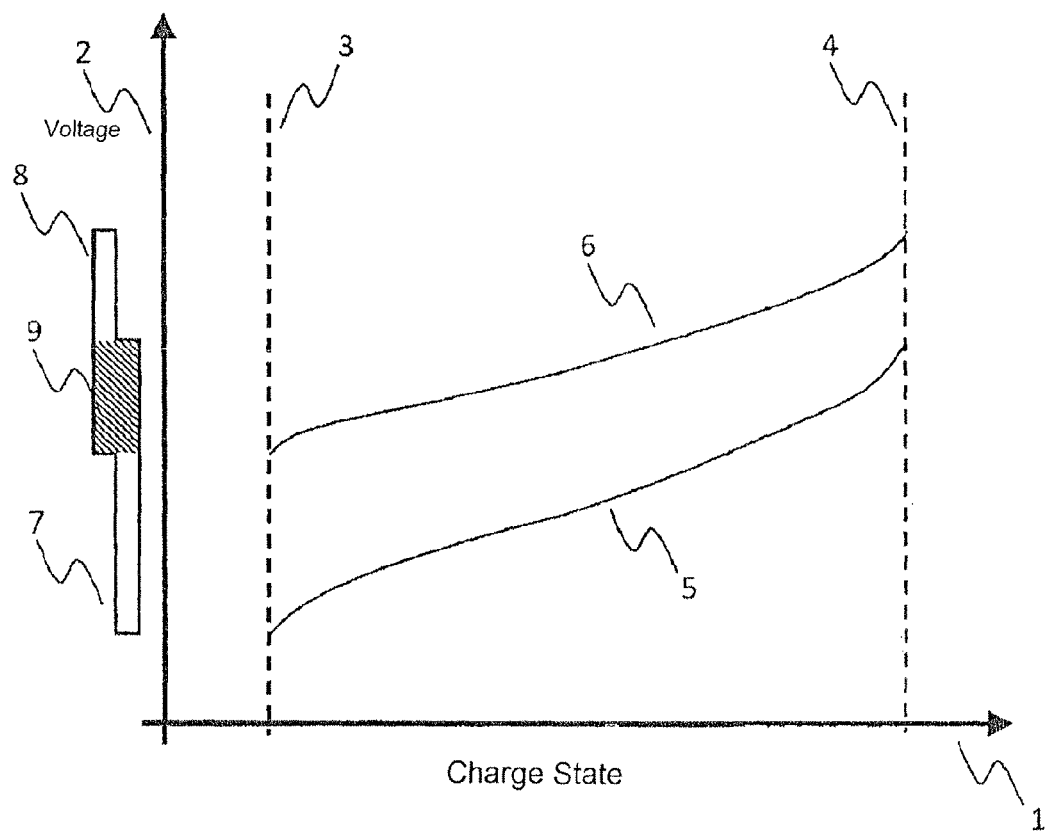
FIG. 1 is a graphical representation of characteristic voltage curves of two electrical energy stores for a motor vehicle.

FIG. 1 shows the form of a characteristic voltage curve of a first electrical energy store (5), which can be configured as a secondary lead-acid battery with a nominal voltage of 12 V, represented in the direction of the vertical axis (2) as a function of the relative charge state (1) thereof. The region of the relative charge state between discharge (3) of the energy store and full charge (4) of the energy store is shown, but the region of a possible exhaustive discharge is not shown. FIG. 1 also shows the form of a corresponding characteristic voltage curve of a second electrical energy store (6), which can be configured as a secondary lithium ion battery with a nominal voltage of 14 V, also represented in the direction of the vertical axis. The two characteristic voltage curves show the open-circuit voltage of the electrical energy store in the equilibrium state, meaning that the voltage between the battery poles is represented, without load or external charging voltage and after a time period sufficiently long for the establishment of thermal and chemical equilibrium. The voltage range (7) covered by the first characteristic voltage curve (5) and the voltage range (8) covered by the second characteristic voltage curve (6) have an overlap region (9), that is to say, the entire voltage range covered by the first characteristic voltage curve does not lie at higher voltage values than the voltage range covered by the second characteristic voltage curve.

Figure 2:
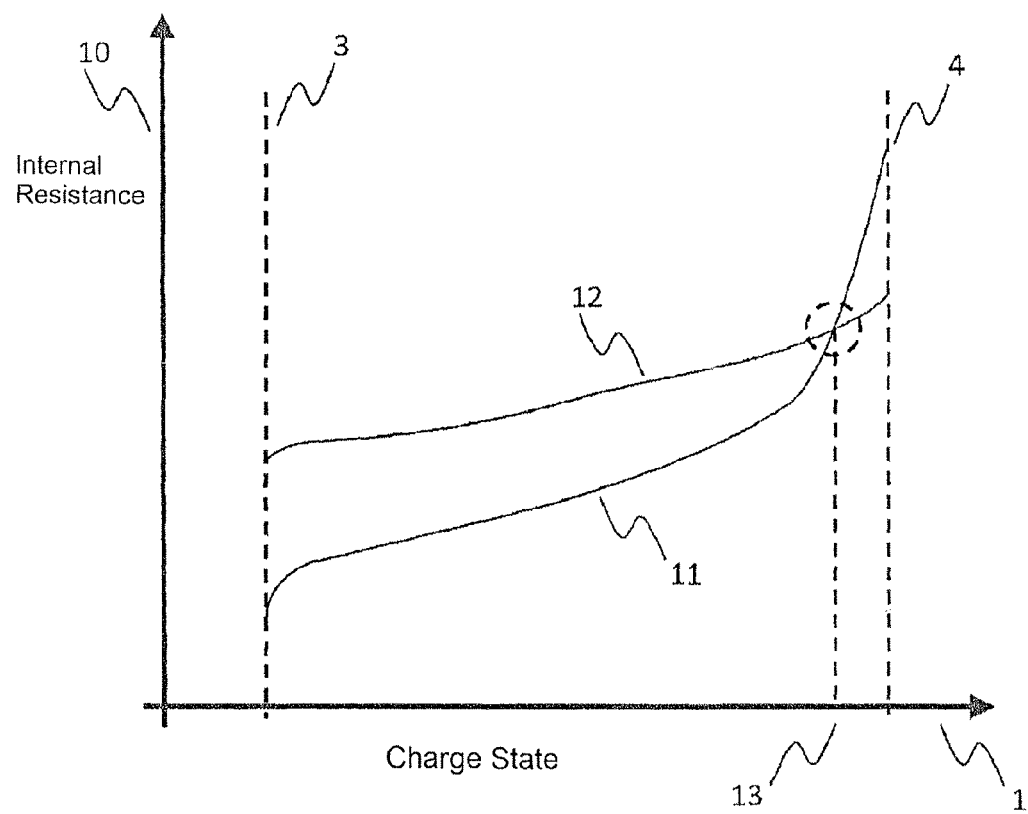
FIG. 2 is a graphical representation of characteristic resistance curves of two electrical energy stores for a motor vehicle.

The selection of two electrical energy stores based on the characteristic voltage curves in an energy storage device for a motor vehicle is extended through the selection based on the characteristic resistance curves. FIG. 2 shows the course of the internal resistance, represented in the direction of the vertical axis (10), of the first electrical energy store (11) during a charging procedure. This curve is represented as a function of the relative charge state (1) in the region between discharge (3) and full charge (4). In a similar manner, the course of the internal resistance of the second electrical energy store (12) is shown. A value of the relative charge state (13), designated the critical charge state, is assigned to the intersection of the two characteristic resistance curves. Within the operational strategy and within the energy management of the motor vehicle, the critical charge state (13) can be used as a control and regulating parameter. For the purpose of a simple operational strategy of the energy storage device, only the charge state of the lead-acid battery is to be detected, for example, by voltage measurement with a battery sensor. A charge voltage of the energy storage device of, for example, 13.3 V is sufficient in order to charge the lead-acid battery fully, whereas the lithium ion battery is in a partially charged state following full charging of the lead-acid battery and is preferably below the critical charge state. If, at relative charge states, the lead-acid battery is above the critical charge state, in the event of a short charging pulse which occurs, for example, in order to recover braking energy in a coasting phase of the motor vehicle as electrochemically bound energy, this preferably leads to charging of the lithium ion battery. By this means, the greater charging efficiency of the lithium ion battery is used and the lead-acid battery is cycled less, in the interests of the service life thereof.

As a consequence of the low self-discharging of a lithium ion battery in comparison with a lead-acid battery and due to the positions of the two characteristic voltage curves of FIG. 1 (second characteristic voltage curve (6) lying above the first characteristic voltage curve (5) in the direction of the vertical axis), when the vehicle is static, the lead-acid battery is charged up by the lithium ion battery. This effect, designated internal charge transfer, takes place when the relative charge state of the lead-acid battery is lower than the value of the critical charge state. Due to the partial overlap of the two characteristic voltage curves, a transfer of electrical charge from the lithium ion battery to the lead-acid battery can take place provided the lithium ion battery is not fully discharged. As a result of the internal charge transfer, the period for which the lead-acid battery remains at low charge states is reduced and therefore the service life of the lead-acid battery is extended. In the event of a cold start, the good cold starting capability of the lead-acid battery is also made use of, as a result of the high charge state thereof, which is not at all, or barely, reduced during the standstill. The energy storage device contributes to this effect in that the probability of a successful and rapid cold starting of the engine of the motor vehicle is increased. However, no such long standstill periods before a cold start of the engine, or micro-short-circuits in the electrical energy stores which lead to deep discharging of both electrical energy stores have been observed. If comfort-related or safety-related consumer units have a high electrical power requirement for short periods, the energy storage device stabilizes the vehicle electrical system voltage without the use of expensive DC-DC converters, since both electrical energy stores are discharged in parallel and thus any resulting voltage breakdown in the energy storage device and in the vehicle electrical system is reduced in comparison with the use of only one of the two electrical energy stores.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. An energy storage device for a motor vehicle, comprising:
   a first electrical energy store, which is characterized by a first characteristic voltage curve defining an open-circuit voltage of the first electrical energy store depending on a relative charge state of the first electrical energy store, and by a first characteristic resis- tance curve defining an internal resistance of the first electrical energy store of relevance for a charging process of the first electrical energy store depending on the relative charge state of the first electrical energy store; and a second electrical energy store connected in parallel to the first electrical energy store, and which is characterized by a second characteristic voltage curve defining the open-circuit voltage of the second electrical energy store depending on a relative charge state of the second electrical energy store, and by a second characteristic resistance curve defining the internal resistance of the second electrical energy store of relevance for a charging process of the second electrical energy store depending on the relative charge state of the second electrical energy store, wherein:

a voltage value range which is covered by the first characteristic voltage curve and a voltage value range covered by the second characteristic voltage curve partially overlap, the first characteristic resistance curve and the second characteristic resistance curve have precisely one intersection point, and the first characteristic voltage curve and the second characteristic voltage curve do not intersect at any point between discharge and full charge of said first and second electrical energy stores.

2. The energy storage device as claimed in claim 1, wherein the first characteristic resistance curve in a region of relative charge states which lie above a value of the relative charge state associated with the intersection point lies above the second characteristic resistance curve.

3. The energy storage device as claimed in claim 2, wherein the voltage value range covered by the second characteristic voltage curve contains higher voltage values than the voltage value range covered by the first characteristic voltage curve.

4. The energy storage device as claimed in claim 3, wherein the first electrical energy store is configured as a lead-acid battery and the second electrical energy store is configured as a lithium ion battery or as a super capacitor.

5. The energy storage device as claimed in claim 1, wherein the first electrical energy store is configured as a lead-acid battery and the second electrical energy store is configured as a lithium ion battery or as a super capacitor.

6. The energy storage device as claimed in claim 1, wherein the parallel connection of the two electrical energy stores is carried out at neutral potential.

* * * * *